(12) United States Patent
Bodin et al.

(10) Patent No.: US 12,043,314 B2
(45) Date of Patent: Jul. 23, 2024

(54) VEHICLE SIDE STRUCTURE

(71) Applicant: Autotech Engineering S.L., Amorebieta-Etxano (ES)

(72) Inventors: Hans Bodin, Södra Sunderbyn (SE); Stefan Arvidsson, Piteå (SE); Robert Viklund, Luleå (SE)

(73) Assignee: Autotech Engineering S.L., Amorebieta-Etxano (ES)

( * ) Notice: Subject to any disclaimer, the term of this patent is extended or adjusted under 35 U.S.C. 154(b) by 160 days.

(21) Appl. No.: 17/767,154

(22) PCT Filed: Oct. 6, 2020

(86) PCT No.: PCT/SE2020/050950
§ 371 (c)(1),
(2) Date: Apr. 7, 2022

(87) PCT Pub. No.: WO2021/071410
PCT Pub. Date: Apr. 15, 2021

(65) Prior Publication Data
US 2022/0363318 A1 Nov. 17, 2022

(30) Foreign Application Priority Data
Oct. 8, 2019 (SE) .................................... 1951145-0

(51) Int. Cl.
*B62D 25/02* (2006.01)
*B62D 21/15* (2006.01)
*B62D 25/00* (2006.01)

(52) U.S. Cl.
CPC ......... *B62D 25/025* (2013.01); *B62D 21/157* (2013.01); *B62D 25/00* (2013.01)

(58) Field of Classification Search
CPC ... B62D 25/00; B62D 25/025; B62D 25/2036
(Continued)

(56) References Cited

U.S. PATENT DOCUMENTS

| 9,493,190 B1 | 11/2016 | Alwan et al. |
| 2008/0036242 A1* | 2/2008 | Glance .................... B60R 19/18 293/133 |

(Continued)

FOREIGN PATENT DOCUMENTS

| AU | 7610001 A | 3/2002 |
| EP | 0 637 538 A1 | 2/1995 |

(Continued)

*Primary Examiner* — Dennis H Pedder
(74) *Attorney, Agent, or Firm* — Blank Rome LLP

(57) ABSTRACT

A vehicle side structure (102; 202) comprising a side portion (104; 204) extending in a longitudinal direction (106; 206), wherein the side portion (104; 204) comprises a first member (108; 208) extending in the longitudinal direction (106; 206) and a second member (110; 210) extending in the longitudinal direction (106; 206). The first member (108; 208) is configured to face an inside (112; 212) of a vehicle, and the second member (110; 210) is configured to face an outside (114; 214) of the vehicle. The first and second members (108, 110; 208, 210) are attached to one another to form a substantially closed space (116; 216) between them. The side portion (104; 204) comprises two wave-shaped reinforcement members (118, 120; 218, 220) located in the substantially closed space (116; 216). The reinforcement members (118, 120; 218, 220) are attached to one another.

19 Claims, 12 Drawing Sheets

(58) Field of Classification Search
USPC .............................. 296/209, 29, 30, 187.12
See application file for complete search history.

(56) References Cited

U.S. PATENT DOCUMENTS

2018/0237075 A1  8/2018  Kawabe et al.
2019/0256150 A1  8/2019  Cooper et al.

FOREIGN PATENT DOCUMENTS

| EP | 1 331 160 A1 | 7/2003 |
| EP | 2 190 720 A1 | 6/2010 |
| FR | 3 010 379 A1 | 3/2015 |
| JP | 2003-335267 A | 11/2003 |
| WO | WO 90/03921 A1 | 4/1990 |
| WO | WO 2009/037537 A1 | 3/2009 |
| WO | WO 2019/059821 A1 | 3/2019 |

* cited by examiner

VEHICLE SIDE STRUCTURE

TECHNICAL FIELD

Aspects of the present invention relate to a vehicle side structure including a side portion extending in a longitudinal direction, wherein the side portion comprises a first member extending in the longitudinal direction and a second member extending in the longitudinal direction. The first member is configured to face an inside of a vehicle, and the second member is configured to face an outside of the vehicle. The first and second members are attached to one another to form a substantially closed space.

BACKGROUND

In the design of a frame portion of a motor vehicle there is a compromise between weight and strength. An advantageous manner of obtaining a good compromise is to produce a frame portion from one or more metal plates formed into a requested shape, e.g. a hat profile.

In general, a frame portion of a motor vehicle is formed to have a certain rigidity since it may receive various impacts from the outside. At the same time, some frame portions should allow deformation for absorbing impacts when receiving an overload, e.g. due to a collision with an external object, e.g. another vehicle or a stationary object, e.g. a tree etc. One example of a vehicle frame portion that should be allowed to deform for absorbing impacts while still being rigid is the vehicle side sill structure.

SUMMARY

The inventors of the present invention have found that a vehicle side structure can be further improved.

An object of the embodiments of the present invention is thus to improve a vehicle side structure.

The above-mentioned object of the present invention and further objects are attained by providing a vehicle side structure comprising a side portion extending in a longitudinal direction, wherein the side portion comprises a first member extending in the longitudinal direction and a second member extending in the longitudinal direction. The first member is configured to face an inside of a vehicle. The second member is configured to face an outside of the vehicle. The first and second members are attached to one another to form a substantially closed space between them.

Further, the side portion comprises a first reinforcement member and a second reinforcement member. Each reinforcement member is located in the substantially closed space, and each reinforcement member extends in the longitudinal direction. Each reinforcement member has a first leg extending in a direction transverse to the longitudinal direction. Each reinforcement member has a second leg extending in a direction transverse to the longitudinal direction. Each of the first and second legs has a foot extending in the longitudinal direction. The feet of the first and second legs of the first reinforcement member are spaced apart from one another, wherein the feet of the first and second legs of the second reinforcement member are spaced apart from one another.

Further, the first and second legs of the first reinforcement member are joined in a first head section. The first and second legs of the second reinforcement member are joined in a second head section. The first head section faces one of the first and second members while the feet of the first reinforcement member face the other one of the first and second members. The second head section faces one of the first and second members while the feet of the second reinforcement member face the other one of the first and second members.

Further, each of the first and second legs is corrugated and comprises corrugations, wherein the corrugations of the first and second legs comprise ridges and grooves. The ridges and grooves of the first reinforcement member extend from the first head section to the respective foot of the first reinforcement member. The ridges and grooves of the second reinforcement member extend from the second head section to the respective foot of the second reinforcement member. The first reinforcement member is attached to the second reinforcement member. Thus, the first and second reinforcement members are attached to one another.

By the innovative reinforcement members of the vehicle side structure, an advantageous deformation of the vehicle side structure for absorbing impacts and/or energy is provided while maintaining or improving the rigidity and reinforcement of the vehicle side structure in order to prevent penetration upon lateral or side collisions. By the innovative reinforcement members, the weight and cost of the vehicle side structure can be reduced while still maintaining or even improving the rigidity and reinforcement of the vehicle side structure. By the innovative reinforcement members, the performance of the vehicle side structure in collisions is improved. By the vehicle side structure including the innovative reinforcement members, an improved vehicle side structure is provided. The vehicle side structure may be a side structure for a motor vehicle, for example a car.

The vehicle side structure may be a vehicle side structure for a motor vehicle with a combustion engine, an electric vehicle having one or more electric batteries, or a hybrid vehicle, for example a car, or a truck. The vehicle side structure may be configured to protect an electric battery of an electric vehicle or a hybrid vehicle, for example upon a collision. The vehicle side structure may be located at one or more sides of an electric battery located in a vehicle. The vehicle side structure is efficient in protecting the driver and/or one or more passengers of the vehicle upon a collision. The vehicle side structure is efficient as a protection with regard to pole collisions or crashes. The vehicle side structure is efficient in preventing the intrusion of a pole into the car upon a pole collision.

According to an advantageous embodiment of the vehicle side structure according to the present invention, each ridge of the first leg of the first reinforcement member is aligned with one of the ridges of the second leg of the first reinforcement member. An advantage of this embodiment is that the first reinforcement member is even more resistant to a collapse or compression and even more improves the rigidity and reinforcement of the first reinforcement member while still being even more efficient in absorbing energy and/or impacts, for example absorbing more energy, resulting from a collision. Consequently, the entire vehicle side structure is even more resistant to a collapse or compression while still being even more efficient in absorbing energy and/or impacts upon a collision. An advantage of this embodiment is that the performance of the vehicle side structure in collisions is further improved. Thus, a further improved vehicle side structure is provided.

According to a further advantageous embodiment of the vehicle side structure according to the present invention, each ridge of the first leg of the second reinforcement member is aligned with one of the ridges of the second leg of the second reinforcement member. An advantage of this embodiment is that the second reinforcement member is even more resistant to a collapse or compression and even more improves the rigidity and reinforcement of the second reinforcement member while still being even more efficient in absorbing energy and/or impacts, for example absorbing more energy, resulting from a collision. Consequently, the entire vehicle side structure is even more resistant to a collapse or compression while still being even more efficient in absorbing energy and/or impacts upon a collision. An advantage of this embodiment is that the performance of the vehicle side structure in collisions is further improved. Thus, a further improved vehicle side structure is provided.

According to another advantageous embodiment of the vehicle side structure according to the present invention, each groove of the first leg of the first reinforcement member is aligned with one of the grooves of the second leg of the first reinforcement member. An advantage of this embodiment is that the first reinforcement member is even more resistant to a collapse or compression and even more improves the rigidity and reinforcement of the first reinforcement member while still being even more efficient in absorbing energy and/or impacts, for example absorbing more energy, resulting from a collision. Consequently, the entire vehicle side structure is even more resistant to a collapse or compression while still being even more efficient in absorbing energy and/or impacts upon a collision. An advantage of this embodiment is that the performance of the vehicle side structure in collisions is further improved. Thus, a further improved vehicle side structure is provided.

According to still another advantageous embodiment of the vehicle side structure according to the present invention, each groove of the first leg of the second reinforcement member is aligned with one of the grooves of the second leg of the second reinforcement member. An advantage of this embodiment is that the second reinforcement member is even more resistant to a collapse or compression and even more improves the rigidity and reinforcement of the second reinforcement member while still being even more efficient in absorbing energy and/or impacts, for example absorbing more energy, resulting from a collision. Consequently, the entire vehicle side structure is even more resistant to a collapse or compression while still being even more efficient in absorbing energy and/or impacts upon a collision. An advantage of this embodiment is that the performance of the vehicle side structure in collisions is further improved. Thus, a further improved vehicle side structure is provided.

According to yet another advantageous embodiment of the vehicle side structure according to the present invention, the first head section is corrugated, wherein the first and second legs of the first reinforcement member and the first head section comprise the corrugations of the first reinforcement member including the ridges and grooves of the first reinforcement member, and wherein each ridge of the first reinforcement member extends from the foot of the first leg of the first reinforcement member to the foot of the second leg of the first reinforcement member through the first head section. An advantage of this embodiment, which essentially provides a non-flat first head section for the first reinforcement member, is that the first reinforcement member is even more resistant to a collapse or compression and even more improves the rigidity and reinforcement of the first reinforcement member while still being even more efficient in absorbing energy and/or impacts, for example absorbing more energy, resulting from a collision. Consequently, the entire vehicle side structure is even more resistant to a collapse or compression while still being even more efficient in absorbing energy and/or impacts upon a collision. An advantage of this embodiment is that the first and second reinforcement members are made even stronger along their entire common circumference, which is formed by the head sections and the legs, and possibly the feet, of the first and second reinforcement members. An advantage of this embodiment is that the performance of the vehicle side structure in collisions is further improved. Thus, a further improved vehicle side structure is provided.

According to an advantageous embodiment of the vehicle side structure according to the present invention, each groove of the first reinforcement member extends from the foot of the first leg of the first reinforcement member to the foot of the second leg of the first reinforcement member through the first head section. An advantage of this embodiment is that the first reinforcement member is even more resistant to a collapse or compression and even more improves the rigidity and reinforcement of the first reinforcement member while still being even more efficient in absorbing energy and/or impacts, for example absorbing more energy, resulting from a collision. Consequently, the entire vehicle side structure is even more resistant to a collapse or compression while still being even more efficient in absorbing energy and/or impacts upon a collision. An advantage of this embodiment is that the first and second reinforcement members are made even stronger along their entire common circumference, which is formed by the head sections and the legs, and possibly the feet, of the first and second reinforcement members. An advantage of this embodiment is that the performance of the vehicle side structure in collisions is further improved. Thus, a further improved vehicle side structure is provided.

According to a further advantageous embodiment of the vehicle side structure according to the present invention, the second head section is corrugated, wherein the first and second legs of the second reinforcement member and the second head section comprise the corrugations of the second reinforcement member including the ridges and grooves of the second reinforcement member, and wherein each ridge of the second reinforcement member extends from the foot of the first leg of the second reinforcement member to the foot of the second leg of the second reinforcement member through the second head section. An advantage of this embodiment, which essentially provides a non-flat second head section for the second reinforcement member, is that the second reinforcement member is even more resistant to a collapse or compression and even more improves the rigidity and reinforcement of the second reinforcement member while still being even more efficient in absorbing energy and/or impacts, for example absorbing more energy, resulting from a collision. Consequently, the entire vehicle side structure is even more resistant to a collapse or compression while still being even more efficient in absorbing energy and/or impacts upon a collision. An advantage of this embodiment is that the first and second reinforcement members are made even stronger along their entire common circumference, which is formed by the head sections and the legs, and possibly the feet, of the first and second reinforcement members. An advantage of this embodiment is that the performance of the vehicle side structure in collisions is further improved. Thus, a further improved vehicle side structure is provided.

According to another advantageous embodiment of the vehicle side structure according to the present invention, each groove of the second reinforcement member extends from the foot of the first leg of the second reinforcement member to the foot of the second leg of the second reinforcement member through the second head section. An advantage of this embodiment, is that the second reinforcement member is even more resistant to a collapse or compression and even more improves the rigidity and reinforcement of the second reinforcement member while still being even more efficient in absorbing energy and/or impacts, for example absorbing more energy, resulting from a collision. Consequently, the entire vehicle side structure is even more resistant to a collapse or compression while still being even more efficient in absorbing energy and/or impacts upon a collision. An advantage of this embodiment is that the first and second reinforcement members are made even stronger along their entire common circumference, which is formed by the head sections and the legs, and possibly the feet, of the first and second reinforcement members. An advantage of this embodiment is that the performance of the vehicle side structure in collisions is further improved. Thus, a further improved vehicle side structure is provided.

According to an advantageous embodiment of the vehicle side structure according to the present invention, the foot of the first leg of the first reinforcement member is attached to the foot of the first leg of the second reinforcement member, wherein the foot of the second leg of the first reinforcement member is attached to the foot of the second leg of the second reinforcement member. By means of this embodiment, the performance of the vehicle side structure in collisions is further improved. Thus, a further improved vehicle side structure is provided.

According to a further advantageous embodiment of the vehicle side structure according to the present invention, each ridge of the first reinforcement member is more prominent in the first head section than at the foot of the first reinforcement member. By means of this embodiment, an advantageous deformation of the vehicle side structure for absorbing impacts is provided while maintaining or improving the rigidity and reinforcement of the vehicle side structure. By means of this embodiment, the performance of a vehicle side structure in collisions is improved.

According to another advantageous embodiment of the vehicle side structure according to the present invention, each ridge of the first reinforcement member gradually increases in size from the foot of the first reinforcement member to the first head section. By means of this embodiment, the performance of the vehicle side structure in collisions is further improved. Thus, a further improved vehicle side structure is provided.

According to yet another advantageous embodiment of the vehicle side structure according to the present invention, each ridge of the second reinforcement member is more prominent in the second head section than at the foot of the second reinforcement member. By means of this embodiment, an advantageous deformation of the vehicle side structure for absorbing impacts is provided while maintaining or improving the rigidity and reinforcement of the vehicle side structure. By means of this embodiment, the performance of a vehicle side structure in collisions is improved.

According to still another advantageous embodiment of the vehicle side structure according to the present invention, each ridge of the second reinforcement member gradually increases in size from the foot of the second reinforcement member to the second head section. By means of this embodiment, the performance of the vehicle side structure in collisions is further improved. Thus, a further improved vehicle side structure is provided.

According to an advantageous embodiment of the vehicle side structure according to the present invention, the first and second reinforcement members are attached to at least one of the first and second members. By means of this embodiment, the performance of a vehicle side structure in collisions is improved. Thus, a further improved vehicle side structure is provided.

According to a further advantageous embodiment of the vehicle side structure according to the present invention, the first reinforcement member defines an inner space between the first and second legs of the first reinforcement member, wherein the second reinforcement member is located at least partially within the inner space defined by the first reinforcement member. By means of this embodiment, the second reinforcement member, which is located at least partially within the inner space, both absorbs impacts when compressed or collapsed in the direction of impact based on the collision and also when the second reinforcement member is expanded by the first reinforcement member upwards or downwards. Thus, a further improved vehicle side structure is provided.

According to another advantageous embodiment of the vehicle side structure according to the present invention, the second head section is located within the inner space defined by the first reinforcement member. By means of this embodiment, the performance of a vehicle side structure in collisions is improved.

According to yet another advantageous embodiment of the vehicle side structure according to the present invention, the feet of the second reinforcement member are located outside the inner space defined by the first reinforcement member. By means of this embodiment, the structure of the combination of the first and second reinforcement members is extended toward the origin of impact upon a side collision. Thus, the first reinforcement member will experience a load from the collision earlier. By means of this embodiment, the performance of a vehicle side structure in collisions is further improved.

According to still another advantageous embodiment of the vehicle side structure according to the present invention, each of the first and second members has a compartment extending in the longitudinal direction, wherein the first and second members are attached to one another such that the compartments form the substantially closed space, and wherein the feet of the first and second reinforcement members are situated in the same compartment. By means of this embodiment, the performance of a vehicle side structure in collisions is improved. Thus, a further improved vehicle side structure is provided.

According to an advantageous embodiment of the vehicle side structure according to the present invention, the first head section is situated in the compartment of one of the first and second members. By means of this embodiment, the performance of a vehicle side structure in collisions is improved. Thus, a further improved vehicle side structure is provided.

According to a further advantageous embodiment of the vehicle side structure according to the present invention, the second head section is situated in the compartment of one of the first and second member. By means of this embodiment, the performance of a vehicle side structure in collisions is improved. Thus, a further improved vehicle side structure is provided.

According to yet another advantageous embodiment of the vehicle side structure according to the present invention, the feet of the first and second reinforcement members are located in the compartment of the second member. By means of this embodiment, the performance of a vehicle side structure in collisions is improved. Thus, a further improved vehicle side structure is provided.

According to still another advantageous embodiment of the vehicle side structure according to the present invention, each of the first and second members has a first side wall and a second side wall, wherein each of the first and second members has a first flange attached to the first side wall and a second flange attached to the second side wall, wherein the first and second members are attached to one another via opposing flanges of the first and second flanges, and wherein the foot of at least one of the first and second legs of at least one of the first and second reinforcement members is attached to at least one of the first and second flanges. By means of this embodiment, an advantageous deformation of the vehicle side structure for absorbing impacts is provided while maintaining or improving the rigidity and reinforcement of the vehicle side structure. By means of this embodiment, the performance of a vehicle side structure in collisions is improved.

According to an advantageous embodiment of the vehicle side structure according to the present invention, a first foot of the feet of one of the first and second legs of one of the first and second reinforcement members is attached to the first flange of one of the first and second members while a second foot of the feet of one of the first and second legs of one of the first and second reinforcement members is attached to the second flange of one and the same member of the first and second members. By means of this embodiment, the performance of a vehicle side structure in collisions is improved. Thus, a further improved vehicle side structure is provided.

According to a further advantageous embodiment of the vehicle side structure according to the present invention, the feet of the first and second legs of the second reinforcement member are attached to the same bottom surface of one of the first or second members. By means of this embodiment, an advantageous deformation of the vehicle side structure for absorbing impacts is provided while maintaining or improving the rigidity and reinforcement of a vehicle side structure.

According to another advantageous embodiment of the vehicle side structure according to the present invention, the feet of the first and second legs of the first reinforcement member are attached to the same bottom surface of one of the first or second members. By means of this embodiment, an advantageous deformation of the vehicle side structure for absorbing impacts is provided while maintaining or improving the rigidity and reinforcement of a vehicle side structure.

According to yet another advantageous embodiment of the vehicle side structure according to the present invention, the first reinforcement member defines an inner space between the first and second legs of the first reinforcement member, wherein the second head section and the feet of the second reinforcement member are located outside the inner space defined by the first reinforcement member. By means of this embodiment, the deformation of the side portion, which takes place at a great impact, is symmetrical and predictable and makes the side portion absorb a great amount of energy. Thus, by means of this embodiment, an advantageous deformation of the vehicle side structure for absorbing impacts is provided while maintaining or improving the rigidity and reinforcement of a vehicle side structure.

According to still another advantageous embodiment of the vehicle side structure according to the present invention, the entire second reinforcement member is located outside the inner space defined by the first reinforcement member. By means of this embodiment, an advantageous deformation of the vehicle side structure for absorbing impacts is provided while maintaining or improving the rigidity and reinforcement of a vehicle side structure.

According to yet another advantageous embodiment of the vehicle side structure according to the present invention, the second reinforcement member defines an inner space between the first and second legs of the second reinforcement member, wherein the entire first reinforcement member is located outside the inner space defined by the second reinforcement member. By means of this embodiment, an advantageous deformation of the vehicle side structure for absorbing impacts is provided while maintaining or improving the rigidity and reinforcement of a vehicle side structure.

According to an advantageous embodiment of the vehicle side structure according to the present invention, each of the first and second members has a compartment extending in the longitudinal direction, each compartment having a bottom surface, wherein the first and second members are attached to one another such that the compartments form the substantially closed space, wherein the first head section is situated in one of the compartments while the second head section is situated in the other one of the compartments. By means of this embodiment, an advantageous deformation of the vehicle side structure for absorbing impacts is provided while further maintaining or improving the rigidity and reinforcement of a vehicle side structure.

According to a further advantageous embodiment of the vehicle side structure according to the present invention, one of the first and second head sections is attached to the bottom surface of one of the compartments. By means of this embodiment, an advantageous deformation of the vehicle side structure for absorbing impacts is provided while further maintaining or improving the rigidity and reinforcement of a vehicle side structure.

According to another advantageous embodiment of the vehicle side structure according to the present invention, one of the first and second head sections is attached to the bottom surface of the compartment of the first member. By means of this embodiment, an advantageous deformation of the vehicle side structure for absorbing impacts is provided while maintaining or improving the rigidity and reinforcement of a vehicle side structure.

According to still another advantageous embodiment of the vehicle side structure according to the present invention, each of the first and second members has a first side wall and a second side wall, wherein each of the first and second members has a first flange attached to the first side wall and a second flange attached to the second side wall, wherein the first and second members are attached to one another via opposing flanges of the first and second flanges, and wherein the foot of at least one of the first and second legs of at least one of the first and second reinforcement members is attached to at least one of the first and second flanges. By means of this embodiment, an advantageous deformation of the vehicle side structure for absorbing impacts is provided while maintaining or improving the rigidity and reinforcement of the vehicle side structure. By means of this embodiment, the performance of a vehicle side structure in collisions is improved.

According to yet another advantageous embodiment of the vehicle side structure according to the present invention, the first reinforcement member and the second reinforcement member are different in size. By means of this embodiment, an advantageous deformation of the vehicle side structure for absorbing impacts is provided while maintaining or improving the rigidity and reinforcement of the vehicle side structure.

According to an advantageous embodiment of the vehicle side structure according to the present invention, the head section of the smaller reinforcement member faces the first member. By means of this embodiment, an advantageous deformation of the vehicle side structure for absorbing impacts is provided while maintaining or improving the rigidity and reinforcement of the vehicle side structure.

According to a further advantageous embodiment of the vehicle side structure according to the present invention, each reinforcement member is formed from a plate, for example a metal plate. This is an efficient way to produce the first and second reinforcement members.

According to another advantageous embodiment of the vehicle side structure according to the present invention, each of the first and second members is formed from a plate, for example a metal plate. This is an efficient way to produce the first and second members.

According to still another advantageous embodiment of the vehicle side structure according to the present invention, each of the first and second members is one of: a hat profile and a U-profile. This is an efficient way to produce the first and second members.

According to yet another advantageous embodiment of the vehicle side structure according to the present invention, the side portion is a side sill portion, and wherein the side sill portion extends in a longitudinal direction of a vehicle body and is provided at a side of the vehicle body. By means of this embodiment, an advantageous deformation of the vehicle side structure having a side sill portion for absorbing impacts is provided while maintaining or improving the rigidity and reinforcement of a vehicle side structure. The innovative reinforcement members are especially advantageous for a side sill portion of the vehicle side structure, where impacts should be absorbed upon certain collisions.

According to an advantageous embodiment of the vehicle side structure according to the present invention, the side sill portion is attached to one or more cross beams of the vehicle body. Hereby, the rigidity of the vehicle side structure may be further improved.

The above-mentioned features and embodiments of the vehicle side structure may be combined in various possible ways providing further advantageous embodiments. Further advantageous embodiments of the vehicle side structure according to the present invention and further advantages with the embodiments of the present invention emerge from the dependent claims and the detailed description of embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION

Figure 1:
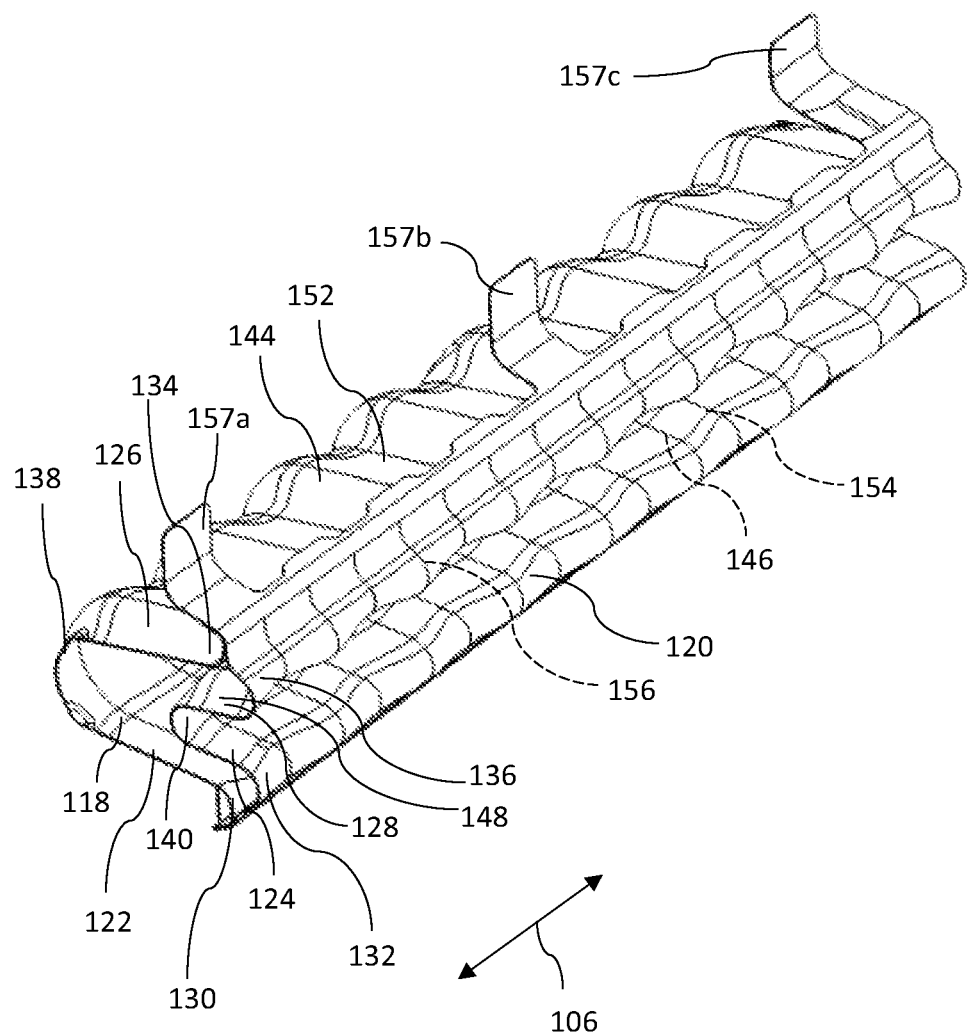
FIG. 1 is a schematic perspective view of two reinforcement members of a first embodiment of the vehicle side structure according to the present invention.
Figure 2:
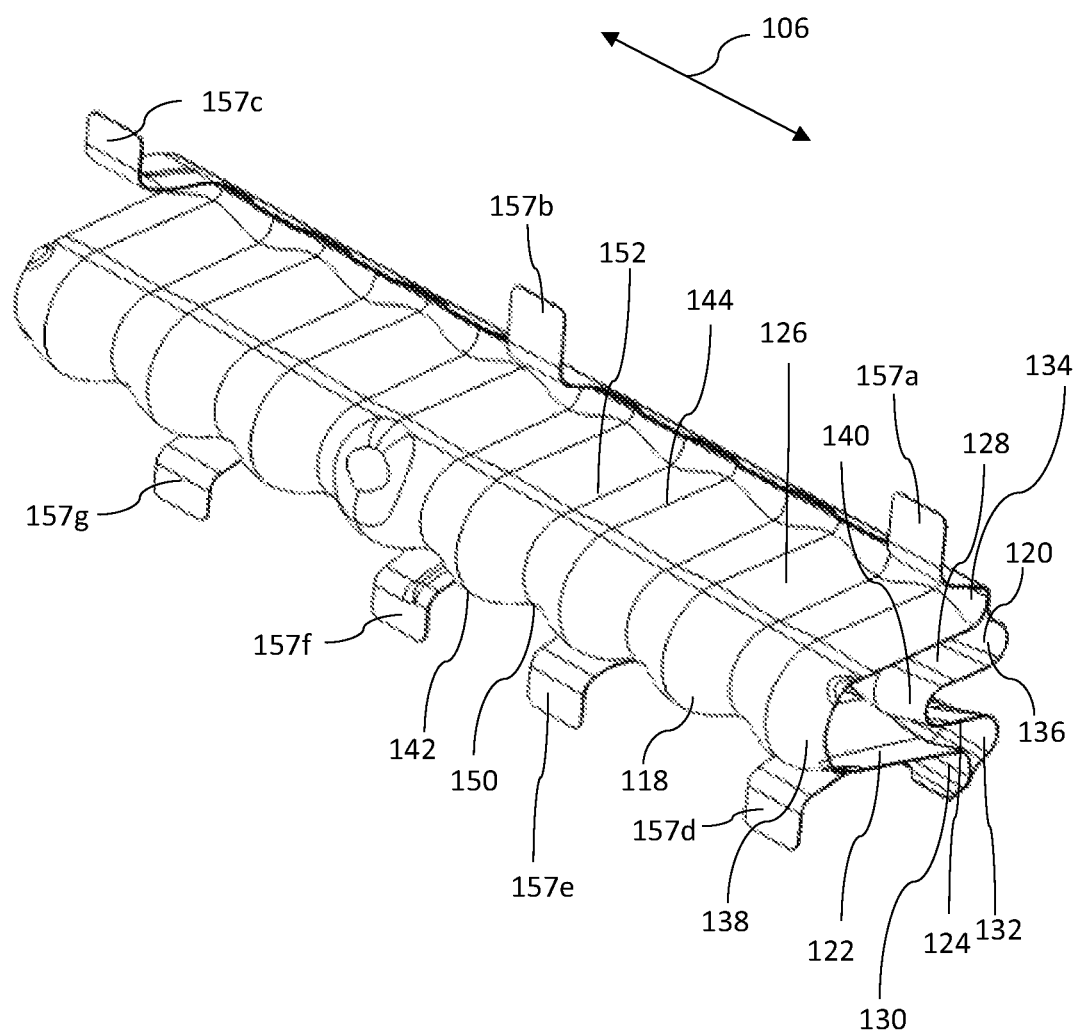
FIG. 2 is a schematic perspective view of the two reinforcement members of FIG. 1 from a different perspective.
Figure 3:
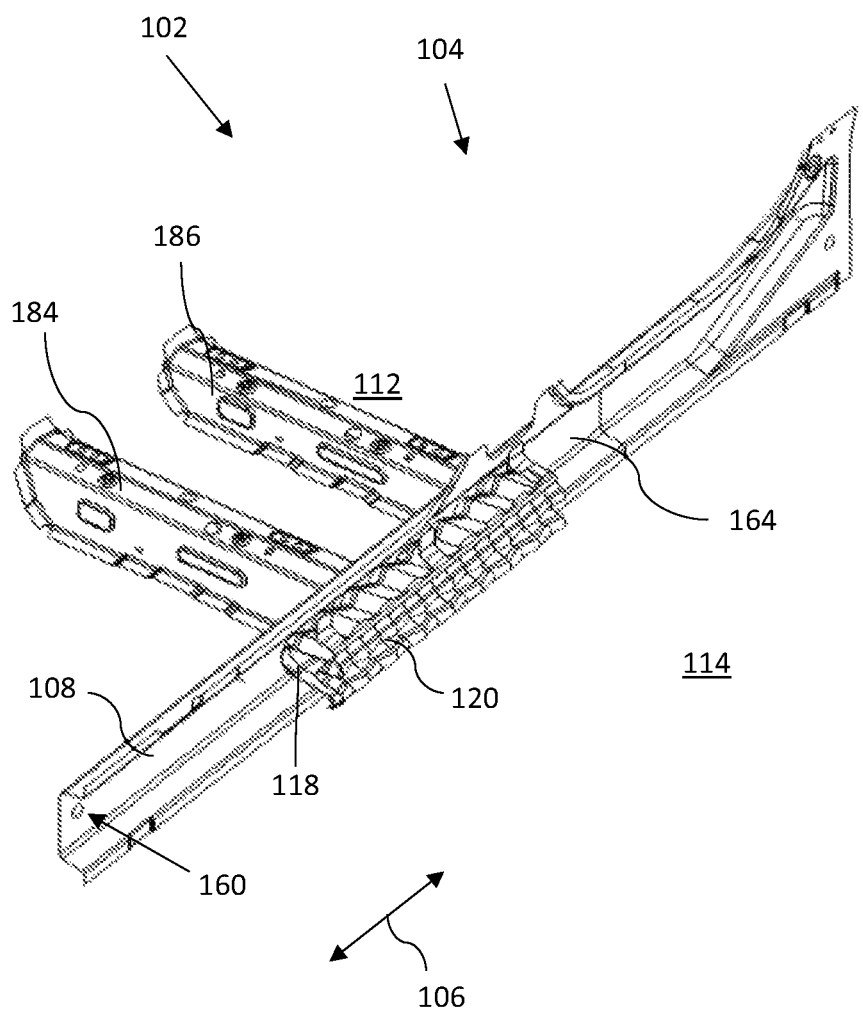
FIG. 3 is a partial schematic perspective view of a first embodiment of the vehicle side structure according to the present invention, including the two reinforcement members of FIGS. 1 and 2.
Figure 4:
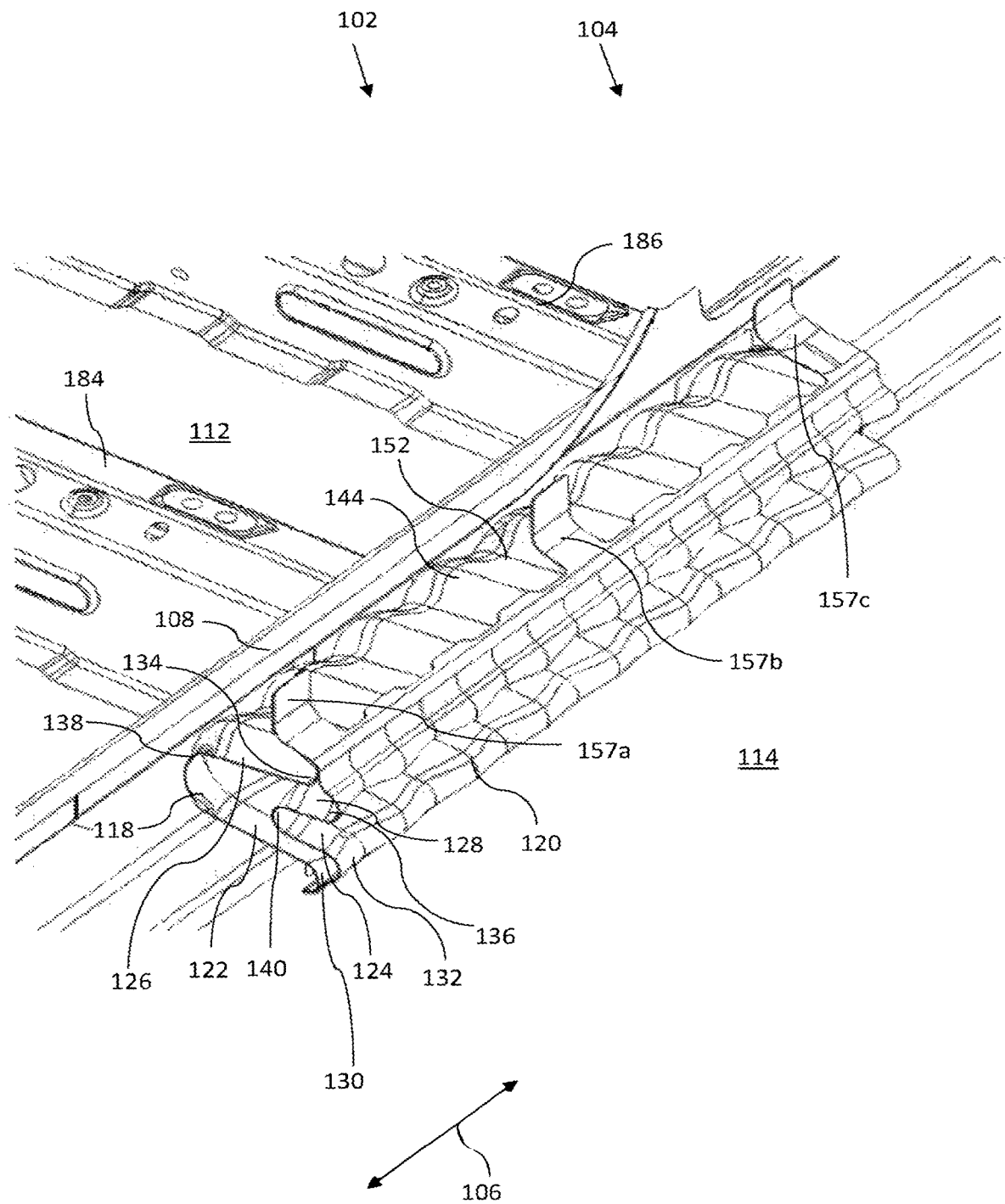
FIG. 4 is an enlargement of a portion of the vehicle side structure of FIG. 3, illustrating the positions of the reinforcement members of the vehicle side structure.
Figure 6:
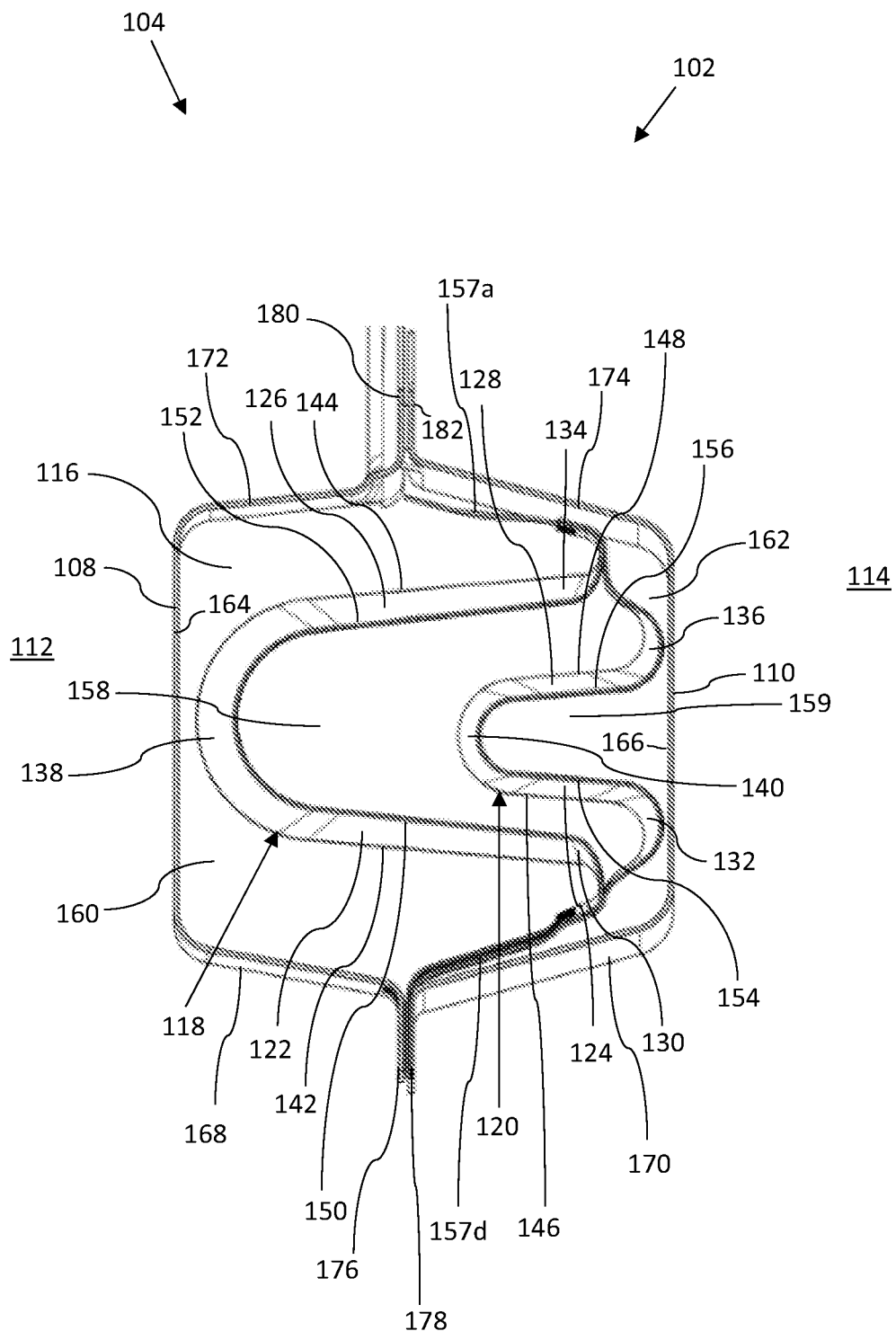
FIG. 6 is a cross-section of the assembled side portion of the first embodiment of the vehicle side structure of FIG. 5 including the two reinforcement members.

With reference to FIGS. 1, 2 and 6, a side portion 104 of the vehicle side structure 102 according to a first embodiment includes a first reinforcement member 118 and a second reinforcement member 120. Each reinforcement member 118, 120 extends in the same longitudinal direction 106. Each reinforcement member 118, 120 of the first and second reinforcement members 118, 120 is formed from a plate, for example a metal plate, such as a plate of aluminium, or any other suitable material, which may be processed by press hardening. Each reinforcement member 118, 120 is smoothly wave-shaped in the longitudinal direction 106.

Each reinforcement member 118, 120 has a first leg 122, 124 extending in a direction transverse to the longitudinal direction 106. Each reinforcement member 118, 120 has a second leg 126, 128 extending in a direction transverse to the longitudinal direction 106. Each leg 122, 124, 126, 128 has a foot 130, 132, 134, 136 extending in the longitudinal direction 106. Each foot 130, 132, 134, 136 may be configured in various ways. With reference to the first embodiment of FIGS. 1 to 6, each foot 130, 132, 134, 136 may be a curved portion of the end of the respective leg 122, 124, 126, 128. However, the foot may also be a straight portion of the end of the respective leg 122, 124, 126, 128.

With reference to FIG. 6, the feet 130, 134 of the first and second legs 122, 126 of the first reinforcement member 118 are spaced apart from one another, such that an inner space 158 is formed between the first and second legs 122, 126 of the first reinforcement member 118. The feet 132, 136 of the first and second legs 124, 128 of the second reinforcement member 120 are spaced apart from one another, such that an inner space 159 is formed between the first and second legs 124, 128 of the second reinforcement member 120.

The first and second legs 122, 126 of the first reinforcement member 118 are joined in a first head section 138, which also may be called a first head portion. The first and second legs 124, 128 of the second reinforcement member 120 are joined in a second head section 140, which also may be called a second head portion. By "joined" with regard to each head section 138, 140 and the first and second legs 122, 124, 126, 128 is meant that the two legs 122, 124, 126, 128, i.e. the first and second legs 122, 124, 128, 128 are connected or attached to one another in the first or second head section 138, 140. The head section 138, 140 and the legs 122, 124, 126, 128 of each reinforcement member 118, 120 can be described as forming a U-shape with a foot 130, 132, 134, 136 at each end of the U-shape. Thus, each reinforcement member 118, 120 has a U-shaped cross-section. However, other shapes are possible, for example a V-shaped cross-section.

Each leg 122, 124, 126, 128 is corrugated in the longitudinal direction 106 to form a smooth wave shape and includes corrugations. Each leg 122, 124, 126, 128 may be corrugated substantially along its entire longitudinal extension or length. The corrugations of the first and second legs 122, 124, 126, 128 of each reinforcement member 118, 120 include ridges 142, 144, 146, 148 and grooves 150, 152, 154, 156. Each leg 122, 124, 126, 128 may comprise a plurality of ridges 142, 144, 146, 148, for example five ridges 142, 144, 146, 148 or more, and a plurality of grooves 150, 152, 154, 156, for example five grooves 150, 152, 154, 156 or more. The ridges 142, 144 and grooves 150, 152 of the first reinforcement member 118 extend from the first head section 138 to the respective foot 130, 134 of the first reinforcement member 118. The ridges 146, 148 and grooves 154, 156 of the second reinforcement member 120 extend from the second head section 140 to the respective foot 132, 136 of the second reinforcement member 120. Thus, each leg 122, 124, 126, 128 has a smooth wave shape. By these innovative corrugations, an advantageous deformation of the vehicle side structure 102 for absorbing impacts is attained while maintaining or improving the rigidity and reinforcement of a vehicle side structure 102.

The first reinforcement member 118 is attached to the second reinforcement member 120. Thus, the first and second reinforcement members 118, 120 are attached to one another. The foot 130 of the first leg 122 of the first reinforcement member 118 may be attached to the foot 132 of the first leg 124 of the second reinforcement member 120, for example by means of welding, an adhesive or a mechanical locking structure, such as rivets, or any other suitable fastening means etc. The foot 134 of the second leg 126 of the first reinforcement member 118 may be attached to the foot 136 of the second leg 128 of the second reinforcement member 120, for example by means of welding, an adhesive or a mechanical locking structure, such as rivets, or any other suitable fastening means etc. A foot 130, 134 may be attached to the opposing foot 132, 136 along its entire longitudinal length or extension in the longitudinal direction 106.

With reference to FIG. 6, the first reinforcement member 118 defines an inner space 158 between the first and second legs 122, 126 of the first reinforcement member 118. The second reinforcement member 120 is located at least partially within the inner space 158 defined by the first reinforcement member 118. The second head section 140 is located within the inner space 158 defined by the first reinforcement member 118. However, the feet 132, 136 of the second reinforcement member 120 are located outside the inner space 158 defined by the first reinforcement member 118. With reference to FIGS. 1, 2 and 6, the first reinforcement member 118 has a plurality of attachment tongues 157a-157g configured for attachment to a first and/or second member 108, 110 disclosed in more detail hereinbelow. The plurality of attachment tongues 157a-157g may be provided at the feet 130, 134 of the first reinforcement member 118. In an alternative embodiment, the second reinforcement member 120 may be provided with the attachment tongues 157a-157g. The attachment tongues 157a-157g may be integral with the first reinforcement member 118 (i.e. formed as a unit with the first reinforcement member 118) or attached to the first reinforcement member 118 for example by means of welding, an adhesive or a mechanical locking structure, such as rivets, or any other suitable fastening means etc.

With reference to FIGS. 3 to 6, the vehicle side structure 102 includes a side portion 104 extending in the longitudinal direction 106. The side portion 104 has a first member 108 which extends in the longitudinal direction 106. The side portion 104 has a second member 110 which extends in the longitudinal direction 106. The first member 108 is configured to face an inside 112 of a vehicle, for example a motor vehicle, such as a car. The second member 110 is configured to face an outside 114 of the same vehicle. The first and second members 108, 110 are attached to one another to form a substantially closed space 116 between them. The first and second members 108, 110 may be attached to one another for example by means of welding, an adhesive or a mechanical locking structure, such as rivets, or any other suitable fastening means etc. Each of the first and second members 108, 110 may be formed from a plate, for example a metal plate, such as a plate of aluminium, which may be processed by press hardening. In the shown first embodiment, each of the first and second members 108, 110 is a hat profile, but could also be a U-profile. It is to be understood that one or more additional sections or one or more additional members may be placed between the first or second member 108, 110 and the inside 112 or the outside 114 of the vehicle, especially when the vehicle is assembled.

The first head section 138 of the first reinforcement member 118 faces one 108, 110 of the first and second members 108, 110 while the feet 130, 134 of the first reinforcement member 118 face the other one 108, 110 of the first and second members 108, 110. With reference to FIG. 6, in the shown first embodiment, the first head section 138 of the first reinforcement member 118 faces the first member 108 while the feet 130, 134 of the first reinforcement member 118 face the second member 110. However, it could be the other way around. The second head section 140 of the second reinforcement member 120 faces one 108, 110 of the first and second members 108, 110 while the feet 132, 136 of the second reinforcement member 120 face the other one 108, 110 of the first and second members 108, 110. With reference to FIG. 6, in the shown first embodiment, the second head section 140 of the second reinforcement member 120 faces the first member 108 while the feet 132, 136 of the second reinforcement member 120 face the second member 110. However, it could be the other way around. The fact that the first head section 138 faces one 108, 110 of the first and second members 108, 110 while the feet 130, 134 of the first reinforcement member 118 face the other one 108, 110 of the first and second members 108, 110 does not necessarily mean that there is an empty space between the first head section 138 or the feet 130, 134 and the first member 108 or second member 110. Instead, there may be other members or units therebetween. The fact that the second head section 140 faces one 108, 110 of the first and second members 108, 110 while the feet 132, 136 of the second reinforcement member 120 face the other one 108, 110 of the first and second members 108, 110 does not necessarily mean that there is an empty space between the second head section 138 or the feet 132, 136 and the first member 108 or second member 110. Instead, there may be other members or units therebetween.

With reference to FIG. 6, the first and second reinforcement members 118, 120 are attached to at least one of the first and second members 108, 110, where the second reinforcement members 120 may be indirectly attached to one of the first and second members 108, 110 via the first reinforcement member 118. Alternatively, the first reinforcement member 118 may be indirectly attached to one of the first and second members 108, 110 via the second reinforcement member 120. With reference to FIGS. 1, 2 and 6, the first reinforcement member 118 is attached to one of the first and second members 108, 110, for example by means of the plurality of attachment tongues 157a-157g.

Each of the first and second members 108, 110 has a compartment 160, 162. Each compartment 160, 162 has a bottom surface 164, 166 and extends in the longitudinal direction 106. The first and second members 108, 110 are attached to one another such that the compartments 160, 162 form the substantially closed space 116. The feet 130, 132, 134, 136 of the first and second reinforcement members 118, 120 are situated in the same compartment 160, 162, for example in the compartment 162 of the second member 110. The first head section 138 is situated in the compartment 160, 162 of one 108, 110 of the first and second members 108, 110, for example in the compartment 160 of the first member 108. The second head section 140 is situated in the compartment 160, 162 of one 108, 110 of the first and second member 108, 110, for example in the compartment 162 of the second member 110.

Figure 5:
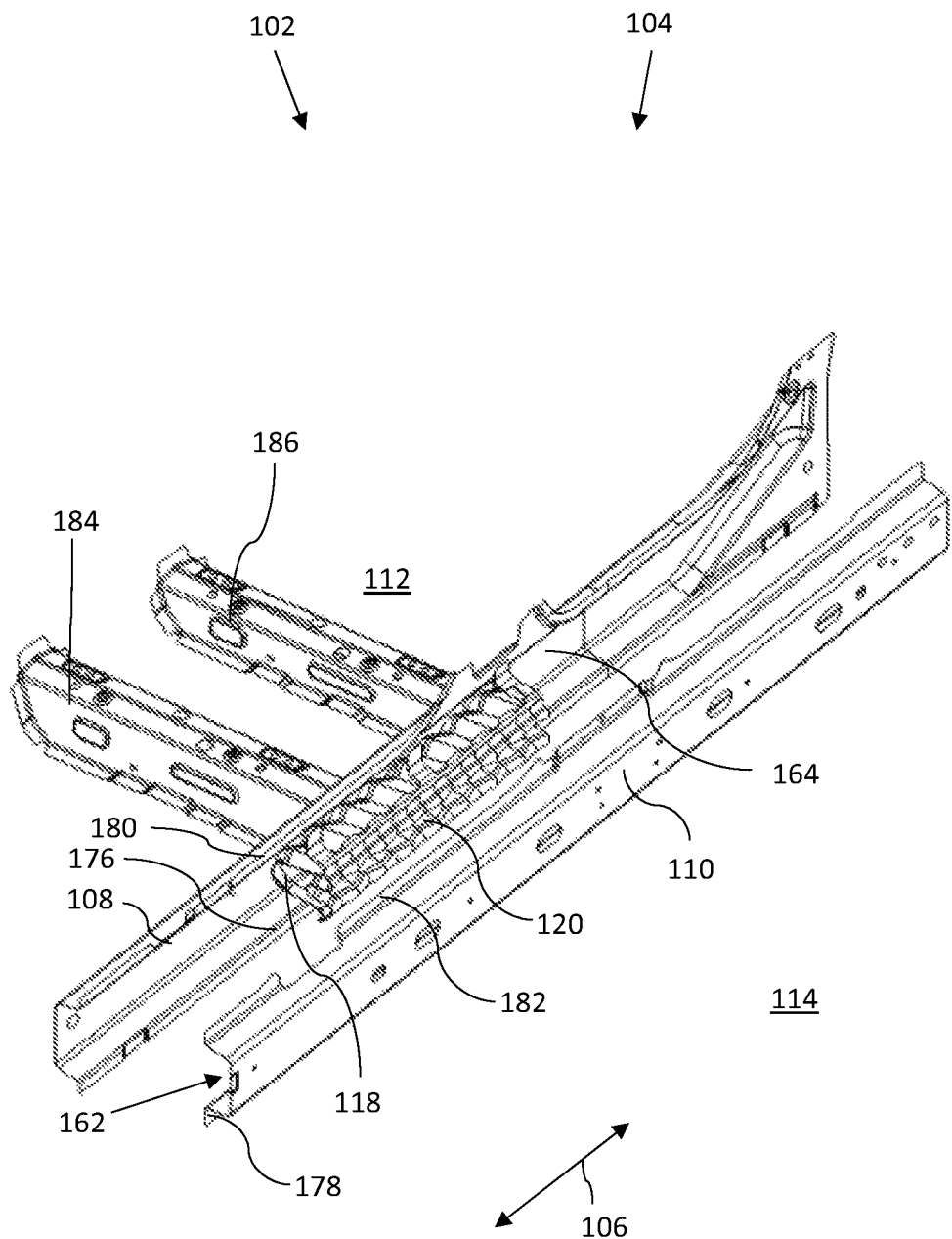
FIG. 5 is an exploded perspective view of the first embodiment of the vehicle side structure of FIG. 6.

With reference to FIGS. 5 and 6, each of the first and second members 108, 110 has a first side wall 168, 170 and a second side wall 172, 174. Each of the first and second members 108, 110 has a first flange 176, 178 attached to the first side wall 168, 170. Each of the first and second members 108, 110 has a second flange 180, 182 attached to the second side wall 172, 174. The first and second members 108, 110 are attached to one another via opposing flanges 176, 178, 180, 182 of the first and second flanges 176, 178, 180, 182, for example by means of welding, an adhesive or a mechanical locking structure, such as rivets, or any other suitable fastening means etc. The foot 130, 132, 134, 136 of at least one of the first and second legs 122, 124, 126, 128 of at least one of the first and second reinforcement members 118, 120, for example the first reinforcement members 118 in the shown first embodiment, is attached to at least one 176, 178, 180, 182 of the first and second flanges 176, 178, 180, 182 via the plurality of attachment tongues 157a-157g. More specifically, a first foot 130, 132, 134, 136 of the feet 130, 132, 134, 136 of the first and second legs 122, 124, 126, 128 of one of the first and second reinforcement members 118, 120, for example the first reinforcement members 118 in the shown first embodiment, is attached to the first flange 176, 178 of one 108, 110 of the first and second members 108, 110, by means of some of the plurality of attachment tongues 157a-157g, while a second foot 130, 132, 134, 136 of the feet 130, 132, 134, 136 of one of the first and second legs 122, 124, 126, 128 of one of the first and second reinforcement members 118, 120, for example the first reinforcement members 118 in the shown first embodiment, is attached to the second flange 180, 182 of one and the same member 108, 110 of the first and second members 108, 110 by means of some of the plurality of attachment tongues 157a-157g.

Advantageously, the assembly of the side portion 104 can proceed by first attaching the first and second reinforcement members 118, 120 to one another and subsequently attaching them to one of the first and second members 108, 110, and then attaching the first and second members 108, 110 to one another. In alternative embodiments, the first head sections 138 may also be attached to one of the first and second members 108, 110, for example to the first member 108.

Figure 7:
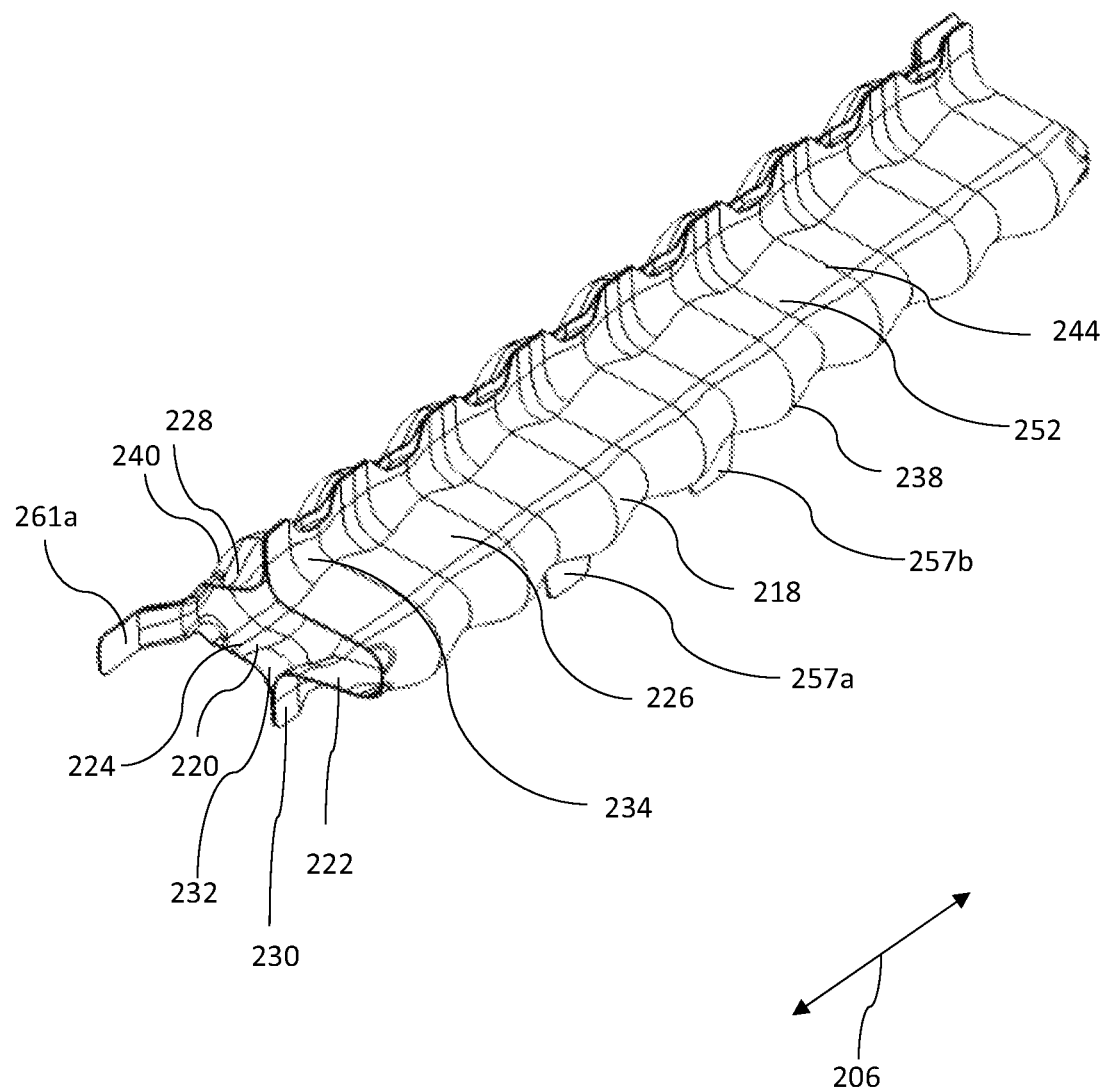
FIG. 7 is a schematic perspective view of two reinforcement members of a second embodiment of the vehicle side structure according to the present invention.
Figure 8:
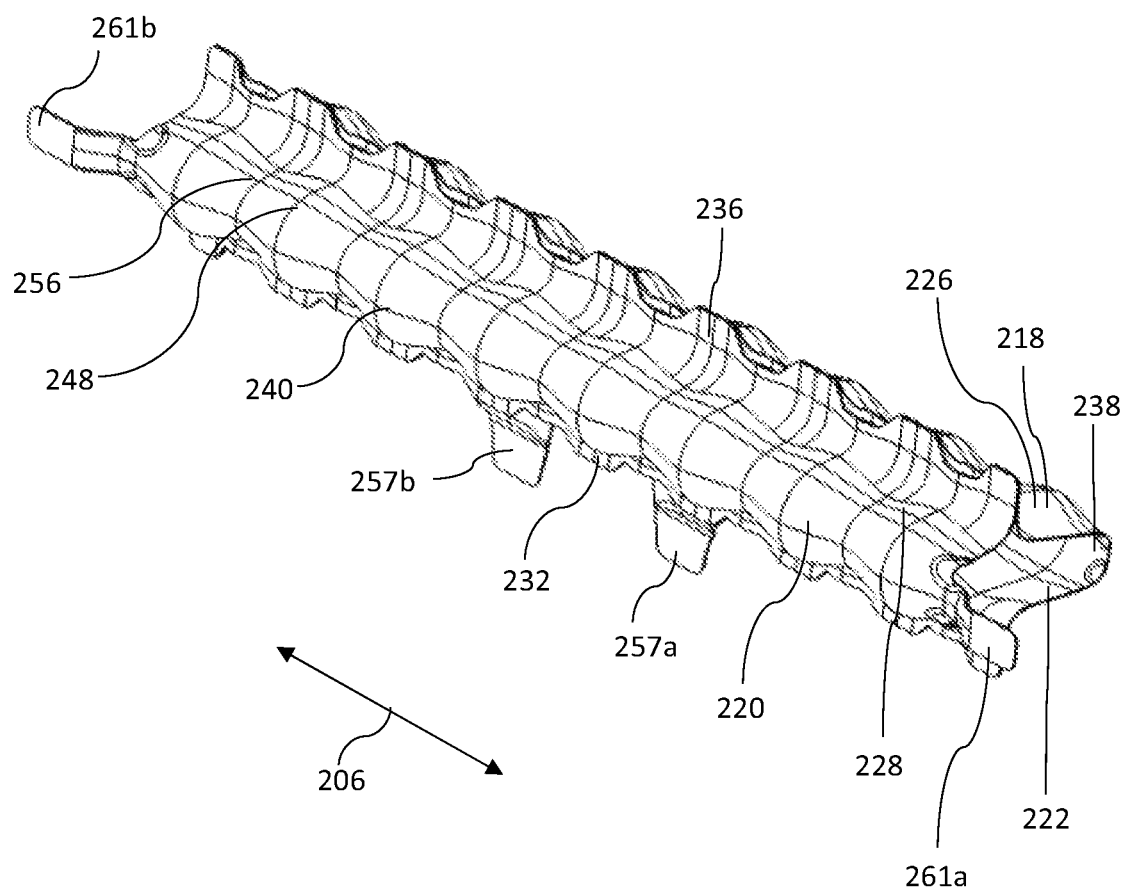
FIG. 8 is a schematic perspective view of the two reinforcement members of FIG. 7 from a different perspective.
Figure 9:
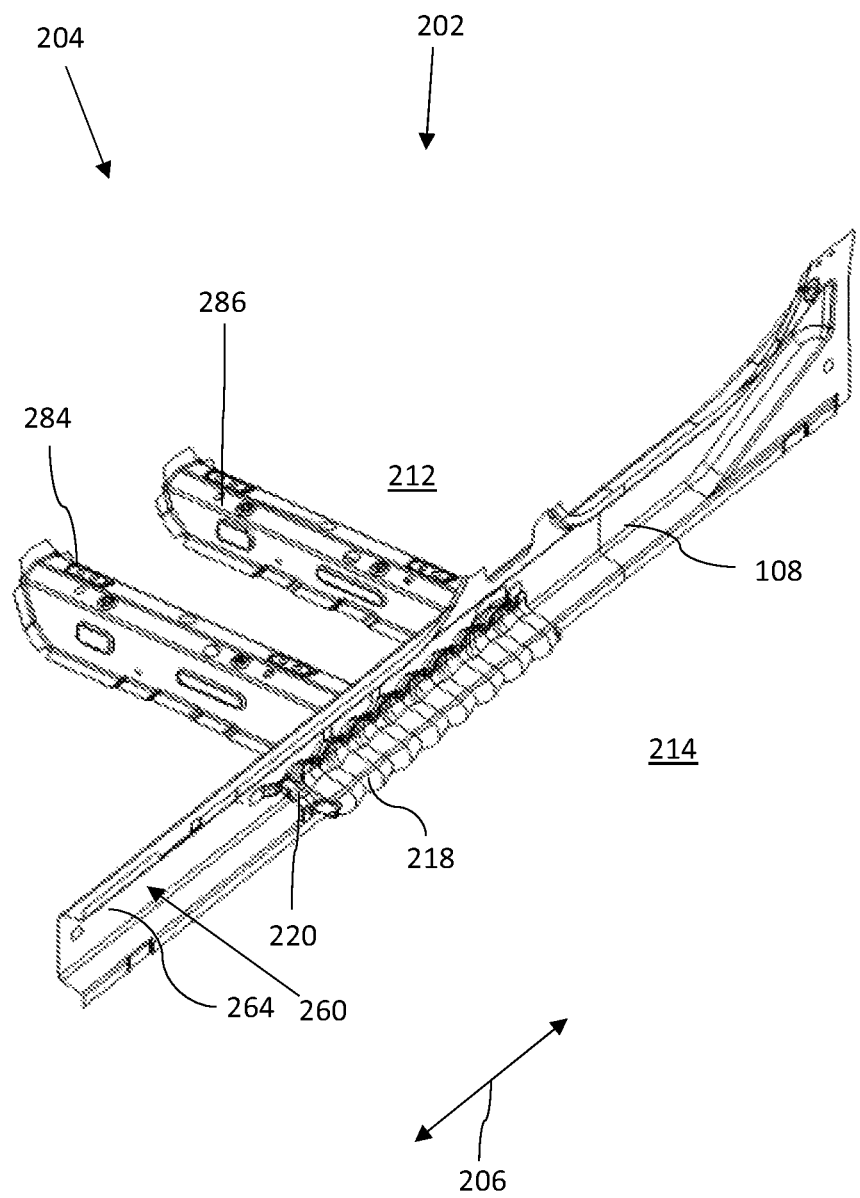
FIG. 9 is a partial schematic perspective view of a second embodiment of the vehicle side structure according to the present invention, including the two reinforcement members of FIGS. 7 and 8.
Figure 10:
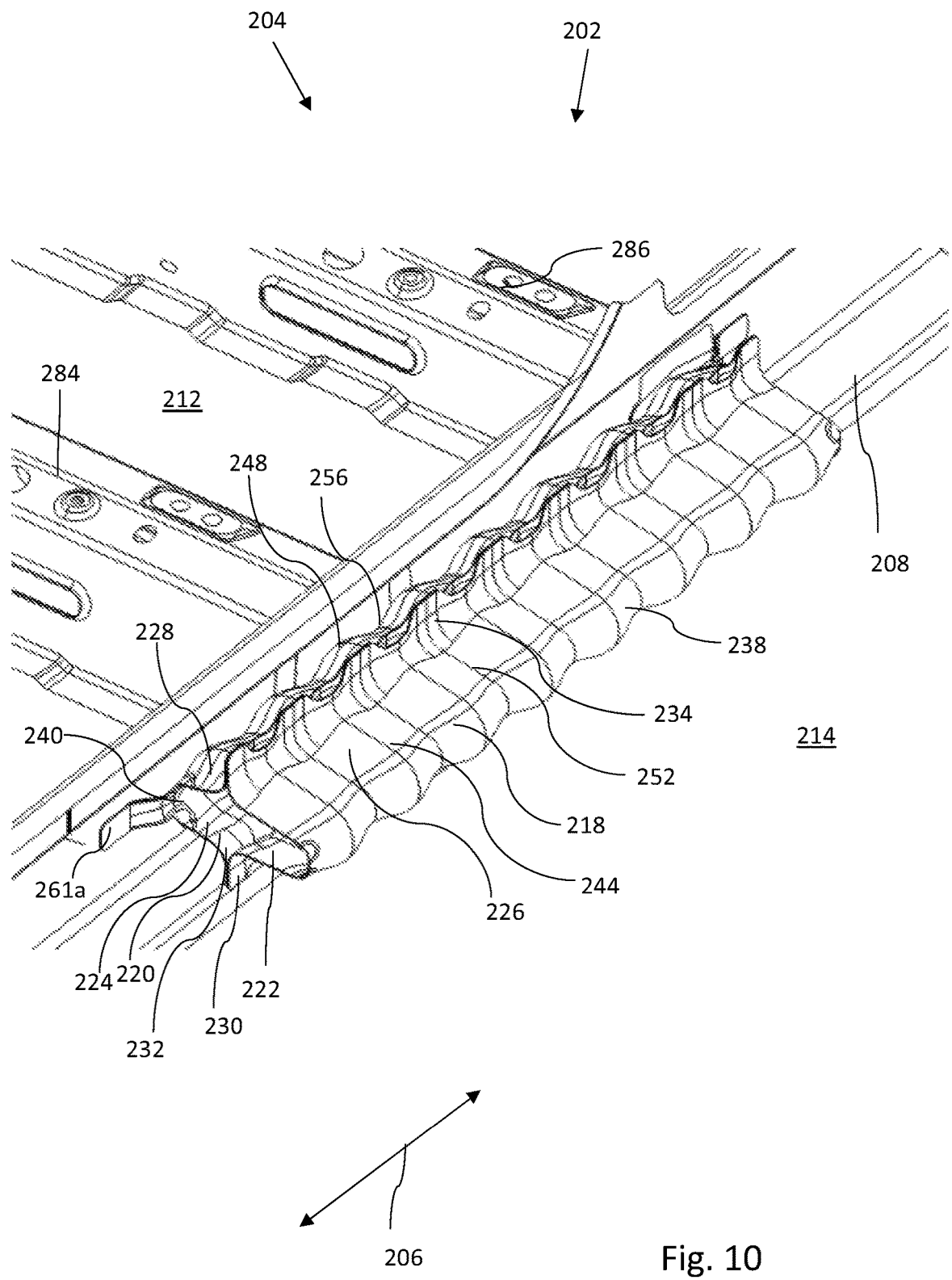
FIG. 10 is an enlargement of a portion of the vehicle side structure of FIG. 9, illustrating the positions of the reinforcement members of the vehicle side structure.
Figure 12:
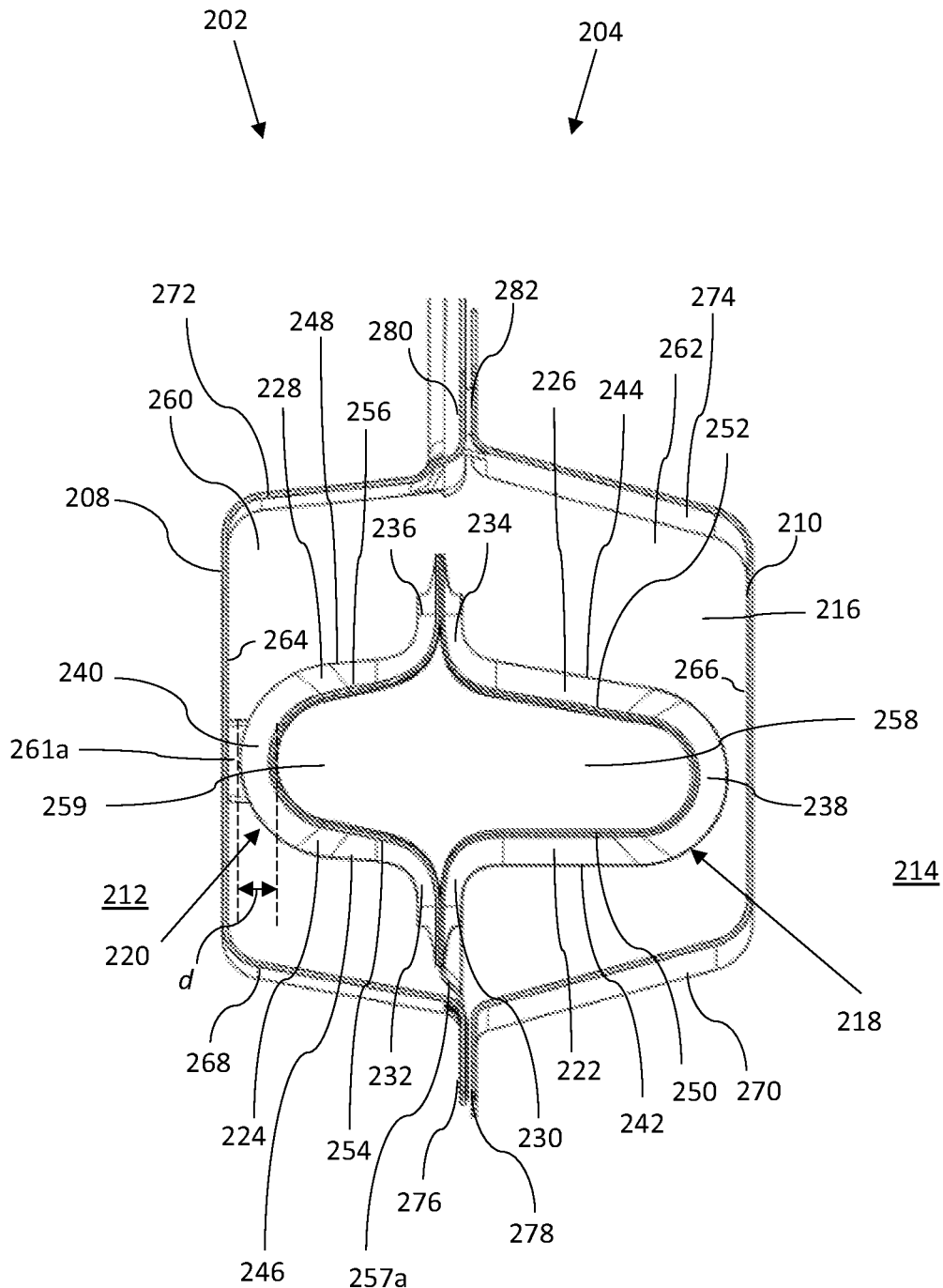
FIG. 12 is a cross-section of the assembled side portion of the second embodiment of the vehicle side structure of FIG. 5 including the two reinforcement members.

With reference to FIGS. 7, 8 and 12, a side portion 204 of the vehicle side structure 202 according to a second embodiment has a first reinforcement member 218 and a second reinforcement member 220. Each reinforcement member 218, 220 extends in the same longitudinal direction 206. Each reinforcement member 218, 220 is formed from a plate, for example a metal plate, such as a plate of aluminium, or any other suitable material, which may be processed by press hardening. Each reinforcement member 218, 220 is smoothly wave-shaped in the longitudinal direction 206.

Each reinforcement member 218, 220 has a first leg 222, 224 which extends in a direction transverse to the longitudinal direction 206. Each reinforcement member 218, 220 has a second leg 226, 228 which extends in a direction transverse to the longitudinal direction 206. Each leg 222, 224, 226, 228 has a foot 230, 232, 234, 236 which extends in the longitudinal direction 206. Each foot 230, 232, 234, 236 may be configured in various ways. With reference to the second embodiment of FIGS. 7 to 12, each foot 230, 232, 234, 236 may be a curved portion of the end of the respective leg 222, 224, 226, 228. However, the foot may also be a straight portion of the end of the respective leg 222, 224, 226, 228. With reference to FIGS. 7 and 8, the foot 230, 232, 234, 236 may form a wave shape including a plurality of flaps, but this is not necessary.

With reference to FIG. 12, the feet 230, 234 of the first and second legs 222, 226 of the first reinforcement member 218 are spaced apart from one another, such that an inner space 258 is formed between the first and second legs 222, 226 of the first reinforcement member 218. The feet 232, 236 of the first and second legs 224, 228 of the second reinforcement member 220 are spaced apart from one another, such that an inner space 259 is formed between the first and second legs 224, 228 of the second reinforcement member 220.

The first and second legs 222, 226 of the first reinforcement member 218 are joined in a first head section 238, which also may be called a first head portion. The first and second legs 224, 228 of the second reinforcement member 220 are joined in a second head section 240, which also may be called a second head portion. Thus, each reinforcement member 218, 220 has a U-shaped cross-section. However, other shapes are possible, for example a V-shaped cross-section.

Each leg 222, 224, 226, 228 is corrugated in the longitudinal direction 206 to form a smooth wave shape and includes corrugations 242, 244, 246, 248, 250, 252, 254, 256. Each leg 222, 224, 226, 228 may be corrugated substantially along its entire longitudinal extension or length. The corrugations 242, 244, 246, 248, 250, 252, 254, 256 of the first and second legs 222, 224, 226, 228 of each reinforcement member 218, 220 include ridges 242, 244, 246, 248 and grooves 250, 252, 254, 256. Each leg 222, 224, 226, 228 may comprise a plurality of ridges 242, 244, 246, 248, for example five ridges 242, 244, 246, 248 or more, and a plurality of grooves 250, 252, 254, 256, for example five grooves 250, 252, 254, 256 or more. The ridges 242, 244 and grooves 250, 252 of the first reinforcement member 218 extend from the first head section 238 to the respective foot 230, 234 of the first reinforcement member 218. The ridges 246, 248 and grooves 254, 256 of the second reinforcement member 220 extend from the second head section 240 to the respective foot 232, 236 of the second reinforcement member 220. Thus, each leg 222, 224, 226, 228 has a smooth wave shape.

The first reinforcement member 218 is attached to the second reinforcement member 220. The foot 230 of the first leg 222 of the first reinforcement member 218 may be attached to the foot 232 of the first leg 224 of the second reinforcement member 220, for example by means of welding, an adhesive or a mechanical locking structure, such as rivets, or any other suitable fastening means etc. The foot 234 of the second leg 226 of the first reinforcement member 218 may be attached to the foot 236 of the second leg 228 of the second reinforcement member 220, for example by means of welding, an adhesive or a mechanical locking structure, such as rivets, or any other suitable fastening means etc. A foot 230, 234 may be attached to the opposing foot 232, 236 along its entire longitudinal length or extension in the longitudinal direction 206.

With reference to FIG. 12, the first reinforcement member 218 defines an inner space 258 between the first and second legs 222, 226 of the first reinforcement member 218. The second head section 240 and the feet 232, 236 of the second reinforcement member 220 are located outside the inner space 258 defined by the first reinforcement member 218. More specifically, in the shown second embodiment of FIGS. 7 to 12, the entire second reinforcement member 220 is located outside the inner space 258 defined by the first reinforcement member 218. With reference to FIG. 12, the second reinforcement member 220 defines an inner space 259 between the first and second legs 224, 228 of the second reinforcement member 220. The entire first reinforcement member 218 may be located outside the inner space 259 defined by the second reinforcement member 220, which is the case in the shown second embodiment FIGS. 7 to 12.

With reference to FIGS. 7, 8 and 12, the first reinforcement member 218 has a plurality of attachment tongues 257a, 257b configured for attachment to a first and/or second member 208, 210 disclosed in more detail hereinbelow. The plurality of attachment tongues 257a, 257b of the first reinforcement member 218 may be provided at at least one of the feet 230, 234 of the first reinforcement member 218. The second reinforcement member 220 has a first attachment tongue 261a at a first end and a second attachment tongue 261b at a second end for attachment to a first and/or second member 208, 210 disclosed in more detail hereinbelow. The first and second attachment tongues 261a, 261b of the second reinforcement member 220 may be provided at the second head section 240 of the second reinforcement member 220. In alternative embodiments, the second reinforcement member 220 may be provided with the attachment tongues 257a, 257b and/or the first reinforcement member 218 may be provide with the first and second attachment tongues 261a, 261b. The attachment tongues 257a, 257b, 261a, 261b may be integral with the respective reinforcement member 218, 220 (i.e. formed as a unit with the respective reinforcement member 218, 220) or attached to the respective reinforcement member 218, 220 for example by means of welding, an adhesive or a mechanical locking structure, such as rivets, or any other suitable fastening means etc.

With reference to FIGS. 9 to 12, the vehicle side structure 202 includes a side portion 204 which extends in the longitudinal direction 206. The side portion 104 has a first member 208 which extends in the longitudinal direction 106. The side portion 204 has a second member 210 which extends in the longitudinal direction 206. The first member 208 is configured to face an inside 212 of a vehicle, for example a motor vehicle, such as a car. The second member 210 is configured to face an outside 214 of the same vehicle. The first and second members 208, 210 are attached to one another to form a substantially closed space 216, for example a closed space 216, between them. The first and second members 208, 210 may be attached to one another for example by means of welding, an adhesive or a mechanical locking structure, such as rivets, or any other suitable fastening means etc. Each of the first and second members 208, 210 may be formed from a plate, for example a metal plate, such as a plate of aluminium, which may be processed by press hardening. In the shown second embodiment, each of the first and second members 208, 210 is a hat profile, but could also be a U-profile.

The first head section 238 of the first reinforcement member 218 faces one 208, 210 of the first and second members 208, 210 while the feet 230, 234 of the first reinforcement member 218 face the other one 208, 210 of the first and second members 208, 210. With reference to FIG. 12, in the shown second embodiment, the first head section 238 of the first reinforcement member 218 faces the second member 210 while the feet 230, 234 of the first reinforcement member 218 face the first member 208. However, it could be the other way around. The second head section 240 of the second reinforcement member 220 faces one 208, 210 of the first and second members 208, 210 while the feet 232, 236 of the second reinforcement member 220 face the other one 208, 210 of the first and second members 208, 210. With reference to FIG. 12, in the shown second embodiment, the second head section 240 of the second reinforcement member 220 faces the first member 208 while the feet 232, 236 of the second reinforcement member 220 face the second member 210. However, it could be the other way around. The fact that the first head section 238 faces one 208, 210 of the first and second members 208, 210 while the feet 230, 234 of the first reinforcement member 218 face the other one 208, 210 of the first and second members 208, 210 does not necessarily mean that there is an empty space between the first head section 238 or the feet 230, 234 and the first member 208 or the second member 210. Instead, there may be other members or units therebetween. The fact that the second head section 240 faces one 208, 210 of the first and second members 208, 210 while the feet 232, 236 of the second reinforcement member 220 face the other one 208, 210 of the first and second members 208, 210 does not necessarily mean that there is an empty space between the second head section 238 or the feet 232, 236 and the first member 208 or the second member 210. Instead, there may be other members or units therebetween.

With reference to FIG. 12, the first and second reinforcement members 218, 220 are attached to at least one of the first and second members 208, 210. The second reinforcement members 220 may be indirectly attached to one of the first and second members 208, 210 via the first reinforcement member 218. Alternatively, the first reinforcement member 218 may be indirectly attached to one of the first and second members 208, 210 via the second reinforcement member 220. With reference to FIGS. 7, 8 and 12, the first reinforcement member 218 is attached to one of the first and second members 208, 210 by means of the plurality of attachment tongues 257a, 257b, wherein the second reinforcement member 220 is directly attached to one of the first and second members 208, 210 by means of the first and second attachment tongues 261a, 261b.

With reference to FIG. 12, each of the first and second members 208, 210 has a compartment 260, 262. Each compartment 260, 262 has a bottom surface 264, 266 and extends in the longitudinal direction 206. The first and second members 208, 210 are attached to one another such that the compartments 260, 262 form the substantially closed space 216. The first head section 238 of the first reinforcement member 218 is situated in one 260, 262 of the compartments 260, 262 while the second head section 240 of the second reinforcement member 220 is situated in the other one 260, 262 of the compartments 260, 262. In the shown second embodiment, the first head section 238 is located in the compartment 262 of the second member 210 while the second head section 240 is located in the compartment 260 of the first member 208.

Figure 11:
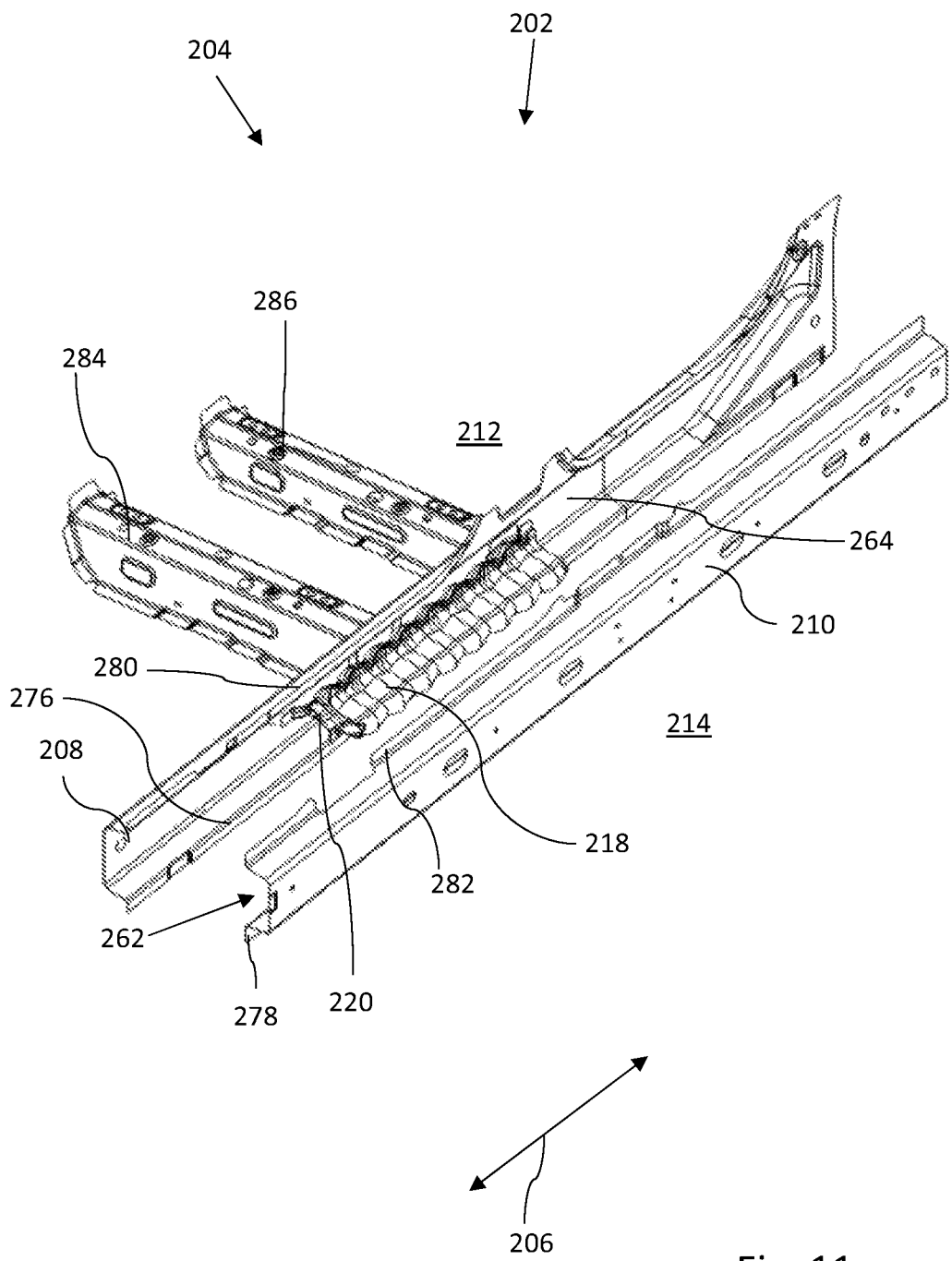
FIG. 11 is an exploded perspective view of the second embodiment of the vehicle side structure of FIG. 12.

With reference to FIGS. 11 and 12, each of the first and second members 208, 210 has a first side wall 268, 270 and a second side wall 272, 274. Each of the first and second members 208, 210 has a first flange 276, 278 attached to the first side wall 268, 270. Each of the first and second members 208, 210 has a second flange 280, 282 attached to the second side wall 272, 274. The first and second members 208, 210 are attached to one another via opposing flanges 276, 278, 280, 282 of the first and second flanges 276, 278, 280, 282, for example by means of welding, an adhesive or a mechanical locking structure, such as rivets, or any other suitable fastening means etc. The foot 230, 232, 234, 236 of at least one of the first and second legs 222, 224, 226, 228 of at least one of the first and second reinforcement members 218, 220, for example the first reinforcement member 218 in the shown second embodiment, is attached to at least one 276, 278, 280, 282 of the first and second flanges 276, 278, 280, 282 via the plurality of attachment tongues 257a, 257b. Further, one of the first and second head sections 238, 240, for example the second head section 240 in the shown second embodiment, is attached to the bottom surface 264, 266 of one of the compartments 260, 262. More specifically, one of the first and second head sections 238, 240 may be attached to the bottom surface 264 of the compartment 260 of the first member 208. More specifically, the second head section 240 may be attached to the bottom surface 264 of the compartment 260 of the first member 208, for example by means of the first and second attachment tongues 261a, 261b.

Advantageously, the assembly of the side portion 204 can proceed by first attaching the first and second reinforcement members 218, 220 to one another and subsequently attaching them to one of the first and second members 208, 210, and then attaching the first and second members 208, 210 to one another. In alternative embodiments, the first head sections 238 may also be attached to one of the first and second members 208, 210, for example to the second member 210.

With reference to FIGS. 2, 6, 7 and 12, each ridge 142; 242 of the first leg 122; 222 of the first reinforcement member 118; 218 may be aligned with one of the ridges 144; 244 of the second leg 126; 226 of the first reinforcement member 118; 218. Hereby, it may be defined that there is a non-zigzag relationship between the ridges 142; 242 of the first leg 122; 222 and the ridges 144; 244 of the second leg 126; 226 of the same (first) reinforcement member 118; 218.

With reference to FIGS. 1, 4, 6, 8 and 12, each ridge 146; 246 of the first leg 124; 224 of the second reinforcement member 120; 220 may be aligned with one of the ridges 148; 248 of the second leg 128; 228 of the second reinforcement member 120; 220. Hereby, it may be defined that there is a non-zigzag relationship between the ridges 146; 246 of the first leg 124; 224 and the ridges 148; 248 of the second leg 128; 228 of the same (second) reinforcement member 120; 220.

With reference to FIGS. 2, 6, 7 and 12, each groove 150; 250 of the first leg 122; 222 of the first reinforcement member 118; 218 may be aligned with one of the grooves 152; 252 of the second leg 126; 226 of the first reinforcement member 118; 218. Hereby, it may be defined that there is a non-zigzag relationship between the grooves 150; 250 of the first leg 122; 222 and the grooves 152; 252 of the second leg 126; 226 of the same (first) reinforcement member 118; 218.

With reference to FIGS. 1, 4, 6, 8 and 12, each groove 154; 254 of the first leg 124; 224 of the second reinforcement member 120; 220 may be aligned with one of the grooves 156; 256 of the second leg 128; 228 of the second reinforcement member 120; 220. Hereby, it may be defined that there is a non-zigzag relationship between the grooves 154; 254 of the first leg 124; 224 and the grooves 156; 256 of the second leg 128; 228 of the same (second) reinforcement member 120; 220.

With reference to FIGS. 1, 2 and 7, the first head section 138; 238 may be corrugated, wherein the first and second legs 122, 126; 222, 226 of the first reinforcement member 118; 218 and the first head section 138; 238 may comprise the corrugations of the first reinforcement member 118; 218, which include the ridges 142, 144; 242, 244 and grooves 150, 152; 250, 252 of the first reinforcement member 118; 218. Each ridge 142, 144; 242, 244 of the first reinforcement member 118; 218 may extend from the foot 130; 230 of the first leg 122; 222 of the first reinforcement member 118; 218 to the foot 134; 234 of the second leg 126; 226 of the first reinforcement member 118; 218 through the first head section 138; 238. Each groove 150, 152; 250, 252 of the first reinforcement member 118; 218 may extend from the foot 130; 230 of the first leg 122; 222 of the first reinforcement member 118; 218 to the foot 134; 234 of the second leg 126; 226 of the first reinforcement member 118; 218 through the first head section 138; 238. It may be defined that the first head section 138; 238 is non-flat.

With reference to FIGS. 1 and 8, the second head section 140; 240 may be corrugated, wherein the first and second legs 124, 128; 224, 228 of the second reinforcement member 120; 220 and the second head section 140; 240 may comprise the corrugations of the second reinforcement member 120; 220, which include the ridges 146, 148; 246, 248 and grooves 154, 156; 254, 256 of the second reinforcement member 120; 220. Each ridge 146, 148; 246, 248 of the second reinforcement member 120; 220 may extend from the foot 132; 232 of the first leg 124; 224 of the second reinforcement member 120; 220 to the foot 136; 236 of the second leg 128; 228 of the second reinforcement member 120; 220 through the second head section 140; 240. Each groove 154, 156; 254, 256 of the second reinforcement member 120; 220 may extend from the foot 132; 232 of the first leg 124; 224 of the second reinforcement member 120; 220 to the foot 136; 236 of the second leg 128; 228 of the second reinforcement member 120; 220 through the second head section 140; 240. It may be defined that the second head section 140; 240 is non-flat.

With reference to FIG. 12, in the shown second embodiment, each ridge 246, 248 of the second reinforcement member 220 is more prominent in the second head section 240 than at the foot 232, 236 of the second reinforcement member 220. By "prominent" is meant that each ridge 246, 248 is bigger in the head section 240 than at the foot 232, 236. Further, in FIG. 12, each ridge 246, 248 of the second reinforcement member 220 gradually increases in size from the foot 232, 236 of the second reinforcement member 220 to the second head section 240. The wave shape of the second reinforcement member 220 forms a member thickness d of the second reinforcement member 220 when viewed in the longitudinal direction 206. In FIG. 12, the member thickness d in the second head section 240 of the second reinforcement member 220 is bigger than the member thickness d at the foot 232, 236 of the second reinforcement member 220. This is advantageous since the stress upon collision impacts is greatest at the second head section 240 compared to at the foot 232, 236 of the second reinforcement member 220. However, in alternative embodiments, the second reinforcement member 220 may be provided without a varying member thickness d as illustrated in FIG. 12 and as disclosed and discussed above. In other alternative embodiments, each ridge 242, 244 of the first reinforcement member 218 may be more prominent in the first head section 238 than at the foot 230, 234 of the first reinforcement member 218. Further, in alternative embodiments, each ridge 242, 244 of the first reinforcement member 218 may gradually increase in size from the foot 230, 234 of the first reinforcement member 218 to the first head section 238. The wave shape with more prominent ridges and less prominent ridges may optionally also be applied to the first and/or second reinforcement members 118, 120 of the first embodiment of FIGS. 1 to 6.

In both the first and second embodiments disclosed above, the first reinforcement member 118; 218 and the second reinforcement member 120; 220 may be different in size. Hereby, the deformation behaviour of the vehicle side structure for absorbing impacts and the rigidity and reinforcement of the vehicle side structure can be further tailored and adapted to a specific application. Advantageously, the head section 140; 240 of the smaller reinforcement member 120; 220 faces the first member 108; 208.

The vehicle side structure 102, 202 may, for example, be used in an electric vehicle or a hybrid vehicle, but of course also in a regular vehicle with a combustion engine only. The vehicle side structure 102, 202 may be configured to protect one or more electric batteries of an electric vehicle or a hybrid vehicle. The vehicle side structure 102, 202 may be located at one or more sides of the electric battery.

Each of the described side portions 104; 204 is advantageously used as a side sill portion 104; 204. Thus, each of the described side portions 104; 204 may be a side sill portion 104; 204. The side sill portion 104; 204 extends in the longitudinal direction 106; 206 of a vehicle body and is provided at a side of the vehicle body. Advantageously, the side sill portion 104; 204 is attached to one or more cross beams 184, 186; 284, 286, for example two cross beams 184, 186; 284, 286 of the vehicle body.

The features of the different embodiments of the vehicle side structure disclosed above may be combined in various possible ways providing further advantageous embodiments. The invention shall not be considered limited to the embodiments illustrated, but can be modified and altered in many ways by one skilled in the art, without departing from the scope of the appended claims.

The invention claimed is:

1. A vehicle side structure comprising a side portion extending in a longitudinal direction, wherein the side portion comprises a first member extending in the longitudinal direction and a second member extending in the longitudinal direction, the first member being configured to face an inside of a vehicle, the second member being configured to face an outside of the vehicle, wherein the first and second members are attached to one another to form a substantially closed space between them, wherein:

the side portion comprises a first reinforcement member and a second reinforcement member, each reinforcement member being located in the substantially closed space, each reinforcement member extending in the longitudinal direction, each reinforcement member has a first leg extending in a direction transverse to the longitudinal direction, each reinforcement member has a second leg extending in a direction transverse to the longitudinal direction, and each of the first and second legs has a foot extending in the longitudinal direction, the feet of the first and second legs of the first reinforcement member are spaced apart from one another, and the feet of the first and second legs of the second reinforcement member are spaced apart from one another, the first and second legs of the first reinforcement member are joined in a first head section, the first and second legs of the second reinforcement member are joined in a second head section, the first head section faces one of the first and second members while the feet of the first reinforcement member face the other one of the first and second members, the second head section faces one of the first and second members, while the feet of the second reinforcement member face the other one of the first and second members, each of the first and second legs is corrugated and comprises corrugations, the corrugations of the first and second legs comprise ridges and grooves, the ridges and grooves of the first reinforcement member extend from the first head section to the respective foot of the first reinforcement member, the ridges and grooves of the second reinforcement member extend from the second head section to the respective foot of the second reinforcement member, and the first reinforcement member is attached to the second reinforcement member;

wherein the first head section is corrugated, the first and second legs of the first reinforcement member and the first head section comprise the corrugations of the first reinforcement member including the ridges and grooves of the first reinforcement member, and each ridge of the first reinforcement member extends from the foot of the first leg of the first reinforcement member to the foot of the second leg of the first reinforcement member through the first head section.

2. A vehicle side structure according to claim 1, wherein each ridge of the first leg of the first reinforcement member is aligned with one of the ridges of the second leg of the first reinforcement member.

3. A vehicle side structure according to claim 1, wherein each ridge of the first leg of the second reinforcement member is aligned with one of the ridges of the second leg of the second reinforcement member.

4. A vehicle side structure according to claim 1, wherein each groove of the first leg of the first reinforcement member is aligned with one of the grooves of the second leg of the first reinforcement member.

5. A vehicle side structure according to claim 1, wherein each groove of the first leg of the second reinforcement member is aligned with one of the grooves of the second leg of the second reinforcement member.

6. A vehicle side structure according to claim 1, wherein each groove of the first reinforcement member extends from the foot of the first leg of the first reinforcement member to the foot of the second leg of the first reinforcement member through the first head section.

7. A vehicle side structure according to claim 1, wherein the second head section is corrugated, wherein the first and second legs of the second reinforcement member and the second head section comprise the corrugations of the second reinforcement member including the ridges and grooves of the second reinforcement member, and each ridge of the second reinforcement member extends from the foot of the first leg of the second reinforcement member to the foot of the second leg of the second reinforcement member through the second head section.

8. A vehicle side structure according to claim 7, wherein each groove of the second reinforcement member extends from the foot of the first leg of the second reinforcement member to the foot of the second leg of the second reinforcement member through the second head section.

9. A vehicle side structure according to claim 1, wherein the foot of the first leg of the first reinforcement member is attached to the foot of the first leg of the second reinforcement member, and wherein the foot of the second leg of the first reinforcement member is attached to the foot of the second leg of the second reinforcement member.

10. A vehicle side structure according to claim 1, wherein each ridge of the first reinforcement member is more prominent in the first head section than at the foot of the first reinforcement member.

11. A vehicle side structure according to claim 1, wherein the first reinforcement member defines an inner space between the first and second legs of the first reinforcement member, and wherein the second reinforcement member is located at least partially within the inner space defined by the first reinforcement member.

12. A vehicle side structure according to claim 1, wherein the first reinforcement member defines an inner space between the first and second legs of the first reinforcement member, and wherein the second head section and the feet of the second reinforcement member are located outside the inner space defined by the first reinforcement member.

13. A vehicle side structure according to claim 12, wherein the entire second reinforcement member is located outside the inner space defined by the first reinforcement member.

14. A vehicle side structure according to claim 12, wherein the second reinforcement member defines an inner space between the first and second legs of the second reinforcement member, and wherein the entire first reinforcement member is located outside the inner space defined by the second reinforcement member.

15. A vehicle side structure according to claim 12, wherein each of the first and second members has a compartment extending in the longitudinal direction, each compartment having a bottom surface, wherein the first and second members are attached to one another such that the compartments form the substantially closed space, and wherein the first head section is situated in one of the compartments while the second head section is situated in the other one of the compartments.

16. A vehicle side structure according to claim 15, wherein one of the first and second head sections is attached to the bottom surface of one of the compartments.

17. A vehicle side structure according to claim 15, wherein one of the first and second head sections is attached to the bottom surface of the compartment of the first member.

18. A vehicle side structure according to claim 12, wherein each of the first and second members has a first side wall and a second side wall, wherein each of the first and second members has a first flange attached to the first side wall and a second flange attached to the second side wall, wherein the first and second members are attached to one another via opposing flanges of the first and second flanges, and wherein the foot of at least one of the first and second legs of at least one of the first and second reinforcement members is attached to at least one of the first and second flanges.

19. A vehicle side structure according to claim 1, wherein each of the first and second members is formed from a plate.

* * * * *